Aug. 31, 1948.  N. C. CHRISTENSEN  2,448,297
LIQUID ROTOR SPRAY MECHANISM
Filed Nov. 13, 1944  2 Sheets-Sheet 1
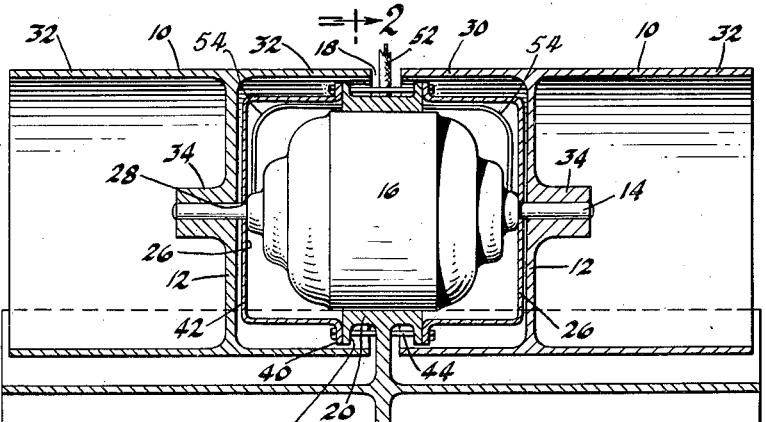
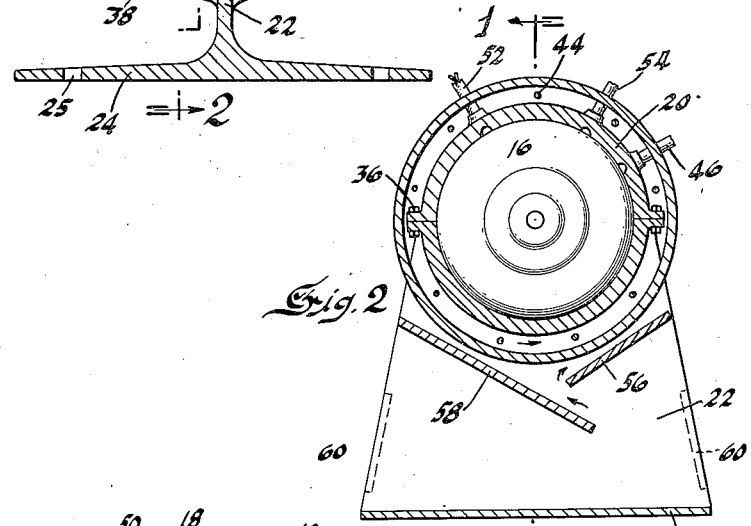
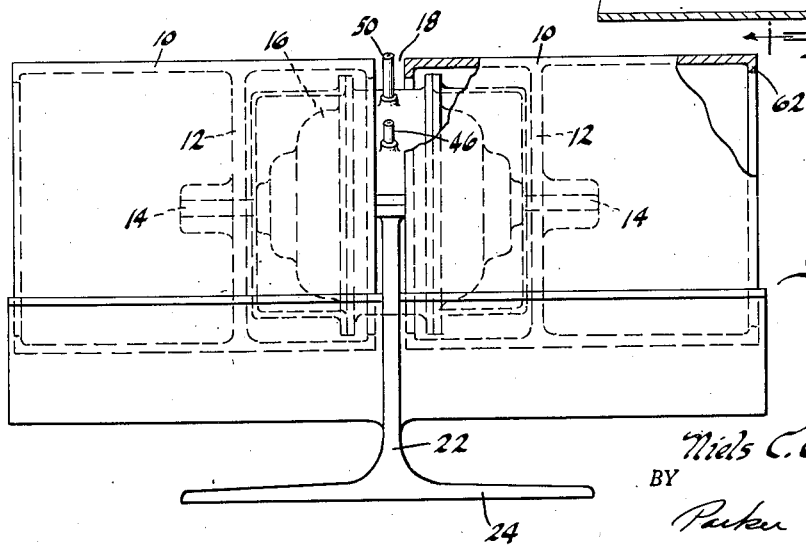
INVENTOR.
Niels C. Christensen
BY
Parker & Burton
attorneys Aug. 31, 1948.  N. C. CHRISTENSEN  2,448,297
LIQUID ROTOR SPRAY MECHANISM
Filed Nov. 13, 1944  2 Sheets-Sheet 2
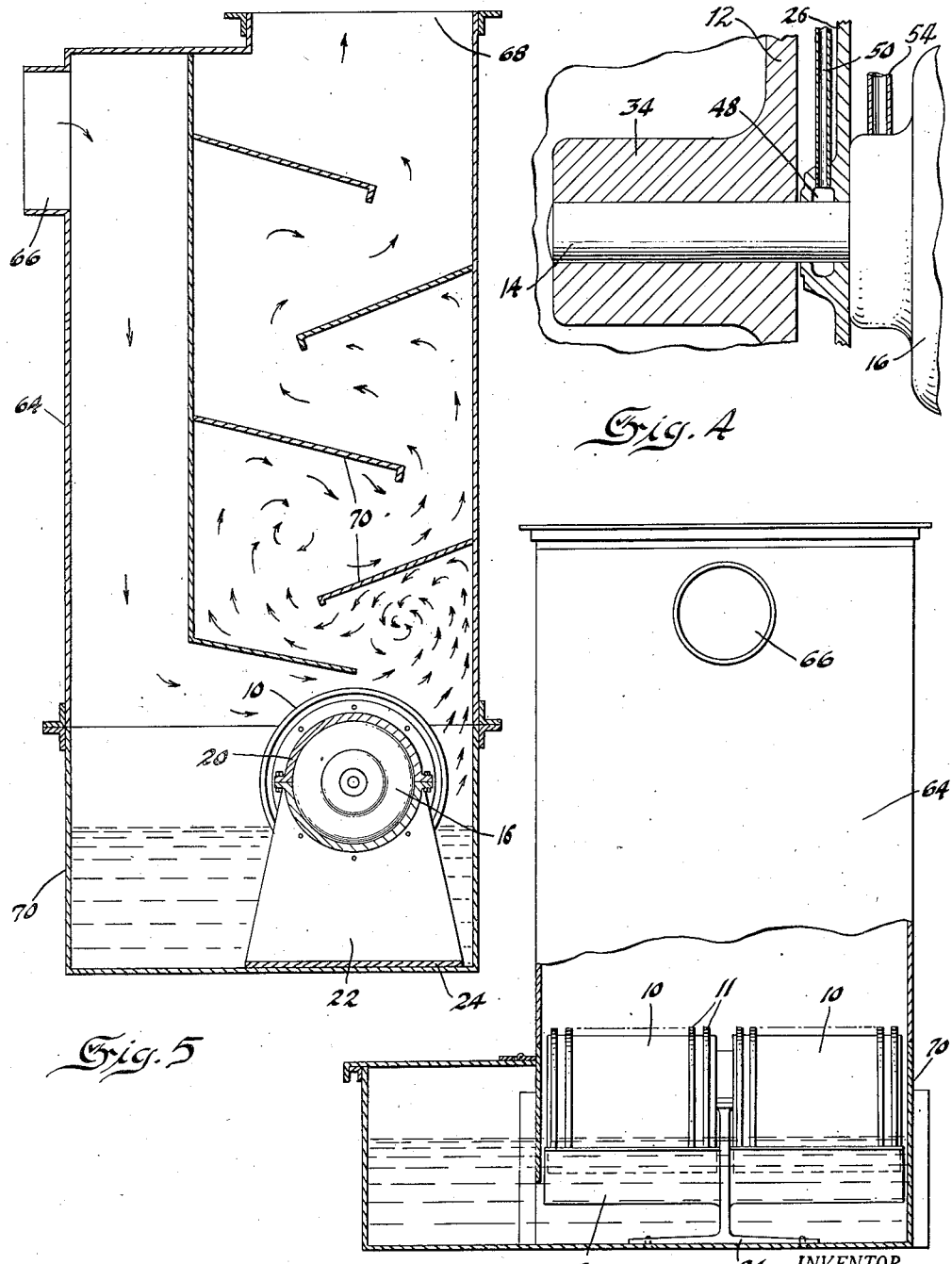

Patented Aug. 31, 1948

2,448,297

UNITED STATES PATENT OFFICE 2,448,297

LIQUID ROTOR SPRAY MECHANISM

Niels C. Christensen, Salt Lake City, Utah

Application November 13, 1944, Serial No. 563,257

11 Claims. (Cl. 299—63)

This invention relates to improved liquid rotor spray mechanism.

In apparatus for making a spray from liquids or pulps by the rapid rotation of a rotor dipping into a body of liquid to be sprayed, such as herein described, and such as illustrated in my Patent 1,462,363 or Dalton Patent 2,243,839, it is desirable to simplify the manufacture and installation, and to secure the maximum mechanical efficiency, smoothness and uniformity of operation.

It is an object of this invention to secure those features which are essential to the most efficient operation of the spray rotor and to eliminate those features which militate against simplicity of design and construction of the complete installation in which the spraying device is used.

Among the major difficulties encountered in installations of spray rotors are the following: (1) securing a balanced rotor, (2) preventing surging of the liquid, (3) keeping the sprayed liquid out of the bearing supporting the rotor, and out of contact with the motor and driving mechanism (4) prevention of leakage from packing glands, (5) excessive floor space required by driving mechanism, (6) obstruction of gas inlet and outlet by the driving mechanism and gland connections, (7) obstruction of solution inflow and level control outflow by driving mechanism and glands for rotor shaft, (8) difficulty of inserting and of removing rotors, (9) loss of power in packing glands and belts used in inclosed or housed installations. These difficulties are minimized by the use of the simple, self-contained, rotor spray unit of this invention.

The spray rotors in use commonly consist of a cylinder connected directly to an electric motor through a flexible coupling, or by a belt from a motor pulley. At peripheral speeds commonly used (1500 to 4000 feet per minute) with rotors of the size commonly used (12" to 15" in diameter and 4 ft. to 6 ft. long) it is difficult to secure a balanced rotor and the pounding of an unbalanced rotor causes heating and wear of the bearings and glands. Under certain conditions it may cause sufficient surging of the liquid in the container to give irregular spraying instead of the constant and uniform spray required for efficient operation.

In open pond installations it is quite difficult, with the commonly used type of rotor and drive, to prevent sprayed liquid from reaching the motor, drive belts, and bearings, which must be suitably housed and protected. In housed installations, the rotor shaft must pass through packing glands in the housing and packing glands in a spray housing require constant attention to prevent leakage and serious loss of power. In conventional installations the driving mechanism takes up considerable floor space and must be well-covered to protect against accidents. Such constructions are a hindrance to neat and compact design.

An object of this invention is to provide a self-contained unit which may be readily installed either in an open pond installation or housed within a cabinet with a minimum of labor and expense and which will function smoothly and with constant uniformity to maintain the highest efficiency of the rotor.

A further object is to provide a gas washer of the rotor spray type wherein the electric motor employed to drive the rotor is supported within the boundary of the casing and the rotor surrounds the motor.

More particularly an object is to provide an easily assembled and simple spray rotor which surrounds the motor that drives the rotor and is supported for rotation by such motor.

The motor is completely protected from the spray liquid and supports the rotor. Preferably the rotor comprises two similar axially aligned cylindrical sections mounted upon opposite ends of the motor shaft and supported thereby to run evenly upon a horizontal axis dipping into the spray liquid to the desired depth.

Other objects, advantages and meritorious features will more fully appear from the following description, appended claims and accompanying drawings wherein:

Figure 1 is a vertical longitudinal section on the axis of the rotor, on line 1—1 of Figure 2.

Figure 2 is a vertical section on line 2—2 of Figure 1.

Figure 3 is a side elevation of the rotor of Figure 1.

Figure 4 is an enlarged partial section on the axis of the device of the motor and rotor hub, showing a grease ring for keeping moisture out of the motor housing and representing a modification of the construction shown in Fig. 1.

Figure 5 illustrates the rotor unit of this invention mounted within an air-washer casing of the type shown in Dalton Patent 2,243,839, showing the casing in vertical section.

Figure 6 is a front elevation of the casing of Figure 5 partly broken away to show the rotor.

The rotor unit of this invention is shown as preferably comprising two similar hollow cylindrical rotor sections 10 each made in the form of a pulley with a solid web 12 instead of spokes. These rotor sections are mounted upon and keyed to opposite ends 14 of the shaft of the motor 16 so as to surround the motor 16 within the two adjacent rotor sections except for an annular median opening 18 between adjacent ends of the two sections.

The motor 16 is supported by a pedestal consisting of an annular ring 20 in which the motor 16 is held and a vertical supporting web 22 extending from the ring 20 to a base 24 through the annular space or opening 18 between the sections. Stationary end bells or casings 26 are attached to flanges 38 of the supporting ring 20 by bolts 44 extending through these flanges of the ring and flanges 40 of the casings 26. These end bells 26 together with this ring 20 form a complete housing around the motor 16 except for the openings 28 in the ends of the end bells, through which openings 28 the two ends of the motor shaft 14 pass.

Each hollow cylindrical rotor section or shell is divided into two end portions 30 and 32 by the web 12 which has a central or axial hub 34 by which the rotors sections are attached to, or mounted upon the protruding ends 14 of the motor shaft. The inner end portions 30 of the two rotor sections which enclose the motor are substantially equal in length, the length being determined by the length of the motor. The annular opening 18 between the two rotor sections is preferably made just wide enough to admit the supporting web 22 of the pedestal and the several pipes for conveying power, oil or grease to the motor or air to the motor housing, as later described.

The hubs of the rotor sections are preferably made on the side of the web 12 opposite to the end portion 30 of the rotor sections. The outer end portions 32 of the rotor sections may be of any desired length, depending upon the desired capacity of the spray rotor and upon the size of the motor shaft, and the weight of the rotor. The diameter of the rotor will depend upon the size of the motor which, in turn, will depend upon the capacity of the spraying unit.

For ordinary commercial units used in air-conditioning, dust scrubbing, acid absorption, etc., the units may vary from 12″ to 15″ in diameter, and in overall length from 2 feet to 6 feet, with motors ranging in size from one to three horsepower. Such motors may operate at from 900 to 1200 R. P. M., depending upon the capacity of the rotor, and the type of spray it is desired to produce, i. e., the depth to which the rotor dips into the liquid sprayed. For use in small air-conditioning installations, the units may range from 3 inches to 8 inches in diameter, and from 6 inches to 24 inches in overall length, with motors ranging in size from $\frac{1}{20}$ to $\frac{1}{4}$ horsepower, and operating at speeds of from 3600 to 1800 R. P. M. The sizes given are merely illustrative, and are not intended to limit the invention, since the rotor may be driven at the speed required to produce the desired spray.

The pedestal which supports the motor includes the annular ring 20 preferably divided on the horizontal axial plane as shown in Figure 2 and clamped together by suitable bolts 36 so as to hold the motor rigidly in place. Supporting web 22 extends from the lower part of the ring to the flat base 24 upon which the entire unit rests. The ring 20 is preferably made with annular flanges 38 for attachment of the end bells 26 as described above. If desired, the end bells might be hemispherical in shape, or of any form suitable for enclosing the motor. The flanges 40 of the end bells are held in place against flanges 38 of the ring 20 by the bolts 44 with a suitable gasket between the flanges to make a watertight joint. The purpose of the complete enclosure of the motor by the ring and end bells is to protect the motor against moisture and fumes.

To prevent admission of any moisture or fumes along the shaft ends 14 through the openings in the rotor section webs, a small flow of air may be sent into the air space around the motor within the enclosure formed by the end bells through the small air-inlet pipe 46 and out through the openings about the shaft ends so as to prevent the entrance of any moisture and to prevent any condensation upon the motor during periods of shut-down. If the use of air for this purpose is not desired the shaft opening through the end walls of the bells 26 may be sealed by a suitable grease ring or chamber 48 attached to the end bells 26 and supplied with grease through the pipe 50 as shown in the modification of Figure 4 only. If a moisture-proof motor is used the end bells may be dispensed with but for most conditions ordinary types of motors, a complete closure to protect against moisture and fumes may be used.

The wires supplying power to the motor enter through the pipe 52 which is screwed into the ring 20. Grease or oil is supplied to the motor bearings through suitable pipes 54, passing through the ring into the space about the motor bearings.

To prevent surging of the liquid to be sprayed, baffles 56 and 58 may be attached to the web 22 of the pedestal to extend longitudinally beneath the rotor sections spaced from the rotor as shown in Figure 4. The outer edges of the baffles extend sufficiently above a horizontal plane tangent to the lowermost part of the rotor and above the liquid level as indicated by the water line in the drawings to prevent surging of the liquid. Baffle 58 extends downward beyond the lower edge of baffle 56 and spaced therefrom providing a longitudinal space between the baffles, through which the liquid flows to the rotor as indicated by the arrows. If operating conditions fluctuate, or the design of the solution basin is such that surging is difficult to prevent, additional longitudinal baffles 60 (Figure 2) may be used.

For heavy sprays, i. e., cases in which the rotor dips rather deeply into the liquid to be sprayed, edge ring 62 (Figure 3) may be used to prevent flow of liquid into the rotor. Though a relatively smooth rotor surface is preferable for most purposes a very smooth or polished surface does not give the maximum spraying effect and the surface of the cylinder may be slightly roughened by knurling or may be provided with ribs or fins 11 (Figure 6) if desired.

For open pond spraying the unit may be disposed as desired in such open pond. In closed housings or cabinets the unit may be disposed to throw the spray into the washing space. In Figures 5 and 6 the unit is illustrated in a cabinet of the type shown in Dalton Patent No. 2,243,839 hereinabove mentioned. The cabinet is indicated as 64 provided with an air-inlet 66, an air-outlet 68, a water reservoir 70 and impingement water eliminator baffles 70.

The material of which the rotor sections, pedestal, and end bells are made will vary with the conditions under which the unit is to be used. For non-corrosive solutions iron or steel or aluminum may be used. For corrosive solutions rubber-covered steel or iron or corrosion-proof alloys may be used. Under some conditions rotors made of Pyrex glass or suitable refractories may be used. Since no shaft is exposed to the solutions and no shaft is required to pass through glands in the spray housing in which the unit may be installed, the invention is especially well adapted for use with corrosive solutions and corrosive pulps since it may be readily made of material suitable for use under such conditions. If the rotors are properly balanced the operation of the unit is so smooth that the base need not be bolted to the floor of the solution basin but may be merely set in place over suitable pins, passing through the base as shown by pin apertures 25 in the base in Figure 1 to secure proper location and prevent lateral movement. Obviously the unit may be bolted down if desired. The form of the rotor makes balancing relatively very easy since the rotor may be machined internally and externally.

From the foregoing description it will be apparent that this simple, compact, self-contained unit avoids many of the difficulties of design, construction and operation hereinabove enumerated and which are present with externally-driven rotor sprays using external shafts, bearings, pulleys, belts and motors, and requiring glands and other protective devices in the spray housings. It will also be apparent that such a unit may be installed with a minimum of difficulty in design or arrangement in any type of housing or general arrangement since no special provisions for driving the rotor are required and no obstruction to the most efficient flow of gases and liquid is offered by the unit making possible the simplest and most efficient design and construction of installations in which the invention is used. For these reasons it is also especially well suited for use in old arrangements and installations already constructed, since it may readily be dropped into place without special provisions for driving shafts, motors, pulleys, belts, glands, etc., and with a minimum of disturbance of the original design or construction.

Having described my invention, what I claim and desire to patent is:

1. Liquid spray mechanism comprising, in combination, a liquid sump, an electric motor having a rotatably driven shaft, means supporting the motor, a spray rotor comprising two end sections coupled with opposite ends of the motor shaft to be driven thereby and each including a hollow cylindrical shell portion extending toward the other section encircling and overhanging the motor.

2. Liquid spray mechanism comprising, in combination, a liquid sump, an electric motor, means supporting the motor, a spray rotor comprising two similar hollow cylindrical end sections supported upon opposite ends of the motor shaft to be rotated thereby, said two end sections substantially surrounding the motor and dipping into the liquid sump.

3. Liquid spray mechanism comprising, in combination, a liquid sump, an electric motor, means supporting the motor, a spray rotor comprising two similar hollow cylindrical end sections supported in axial alignment in a horizontal plane upon opposite ends of the motor shaft to be rotated thereby, said two end sections substantially surrounding the motor and dipping into the liquid sump and being axially spaced apart, said motor supporting means having a part extending through the space between said end sections.

4. A liquid spray unit comprising, in combination, a liquid sump, an electric motor having a rotatable shaft projecting beyond opposite ends of the motor, a spray rotor comprising two similar hollow cylindrical end sections supported in axially spaced apart alignment in a horizontal plane and coupled with opposite ends of the motor shaft to be rotated thereby, said two end sections substantially surrounding the motor and dipping into the liquid sump, a motor support having a web extending between said two rotor sections and engaging the motor to support the same, and electrical connections leading to the motor through the space between said two rotor sections.

5. A liquid spray unit comprising, in combination, a liquid sump, an electric motor having a rotatable shaft projecting beyond opposite ends of the motor, a spray rotor comprising two similar hollow cylindrical end sections supported in axially spaced apart alignment in a horizontal plane and coupled with opposite ends of the motor shaft to be rotated thereby, said two end sections substantially surrounding the motor and dipping into the liquid sump, a motor support having a web extending between said two rotor sections and engaging the motor to support the same, a housing mounted upon the motor support enclosing the motor within said two rotor sections.

6. A liquid spray unit comprising, in combination, a liquid sump, an electric motor having a rotatable shaft projecting beyond opposite ends of the motor, a spray rotor comprising two similar hollow cylindrical end sections supported in axially spaced apart alignment in a horizontal plane and coupled with opposite ends of the motor shaft to be rotated thereby, said two end sections substantially surrounding the motor and dipping into the liquid sump, a motor support having a web extending between said two rotor sections and engaging the motor to support the same, a housing mounted upon the motor support enclosing the motor within said two rotor sections, said housing provided with openings through which the two end sections of the motor shaft extend and sealing means within said openings about the shaft.

7. A liquid spray unit comprising, in combination, a liquid sump, an electric motor having a rotatable shaft projecting beyond opposite ends of the motor, a spray rotor comprising two similar hollow cylindrical end sections supported in axially spaced apart alignment in a horizontal plane and coupled with opposite ends of the motor shaft to be rotated thereby, said two end sections substantially surrounding the motor and dipping into the liquid sump, a motor support having a web extending between said two rotor sections and engaging the motor to support the same, a housing mounted upon the motor support enclosing the motor within said two rotor sections, said housing provided with openings through which the two end sections of the motor shaft extend and means for directing a current of air into the motor housing about the motor to exhaust through the openings in the housing about the motor shaft.

8. A rotor spray unit comprising a motor mounted horizontally in median position within a ring supported by a median web extending downward from the lower part of said ring to a supporting base, two similar hollow cylindrical spray rotor sections each closed by a transverse web having a central hub, and mounted by said hubs on the ends of the shaft of said motor so as to enclose the motor except for a narrow annular median opening between the inner edges of said rotor sections through which said median web passes from the ring to the supporting base.

9. A rotor spray unit comprising, in combination, a motor mounted in median position withing a ring supported by a median web extending downward from the lower part of said ring to a supporting base, two similar end bells attached by their inner edges to opposite edges of said ring so as to enclose said motor within said ring and said bells, the ends of the motor shaft passing through openings in the ends of said bells, two similar hollow cylindrical spray rotor sections each closed by a transverse web with a central hub and mounted by said hubs on said ends of the motor shaft so as to enclose said ring and end bells and motor except for a narrow annular median opening between the inner edges of said rotor sections through which the median web passed from the ring to the base.

10. The invention, as described in claim 9 characterized in that electrical connections extend to said motor through the space between the opposed ends of said rotor sections and through said ring.

11. Liquid spray mechanism comprising, in combination, a liquid sump, an electric motor, means supporting the motor, a spray rotor comprising two hollow cylindrical rotatably supported end sections substantially surrounding the motor and dipping into the liquid sump and coupled with the motor shaft for rotation thereby upon a horizontal axis.

NIELS C. CHRISTENSEN.

REFERENCES CITED

The following references are of record in the file of this patent:

UNITED STATES PATENTS

| Number | Name | Date |
|---|---|---|
| 1,462,363 | Christensen | July 17, 1923 |
| 1,905,101 | Johnson | Apr. 25, 1933 |
| 2,031,055 | McKinne | Feb. 18, 1936 |
| 2,066,913 | Schmieg | Jan. 5, 1937 |
| 2,212,752 | Schmieg | Aug. 27, 1940 |
| 2,215,753 | Goodman et al | Sept. 24, 1940 |
| 2,221,003 | Massey | Nov. 12, 1940 |

FOREIGN PATENTS

| Number | Country | Date |
|---|---|---|
| 85,498 | Sweden | Feb. 11, 1936 |